(12) United States Patent
Mosher

(10) Patent No.: US 7,296,389 B2
(45) Date of Patent: Nov. 20, 2007

(54) SYSTEM, METHOD, AND APPARATUS FOR REMOVING COVERS FROM SHIPPING CONTAINERS

(75) Inventor: Larry Joseph Mosher, San Jose, CA (US)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 136 days.

(21) Appl. No.: 11/091,033

(22) Filed: Mar. 28, 2005

(65) Prior Publication Data

US 2006/0213152 A1 Sep. 28, 2006

(51) Int. Cl.
B65B 65/00 (2006.01)
B65B 43/38 (2006.01)
B67B 7/16 (2006.01)

(52) U.S. Cl. ..................................... 53/390; 53/382.1
(58) Field of Classification Search ................ 53/382.1, 53/390, 393; 81/3.55, 3.56; 29/770, 244
See application file for complete search history.

(56) References Cited

U.S. PATENT DOCUMENTS

| | | | |
|---|---|---|---|
| 3,120,771 A | | 2/1964 | Woodbury |
| 3,301,103 A | | 1/1967 | Shultz et al. |
| 4,178,646 A | * | 12/1979 | Swartz et al. ................. 7/156 |
| 4,201,027 A | * | 5/1980 | Ilsemann ........................ 53/53 |
| 4,492,132 A | | 1/1985 | Obey |
| 4,543,767 A | * | 10/1985 | Wiseman ........................ 53/76 |
| 4,627,217 A | * | 12/1986 | Plaskett .................... 53/377.5 |
| 4,928,816 A | | 5/1990 | Zusy |
| 5,168,779 A | | 12/1992 | Cassidy |
| 5,313,858 A | | 5/1994 | Stitt |
| 5,657,617 A | | 8/1997 | Allen et al. |
| 5,735,034 A | * | 4/1998 | Citron et al. ............ 29/407.09 |
| 5,983,479 A | | 11/1999 | Sato |
| 6,247,597 B1 | | 6/2001 | Sato |
| 6,446,806 B1 | | 9/2002 | Ohori et al. |
| 2003/0029772 A1 | | 2/2003 | Whalen et al. |
| 2004/0136818 A1 | | 7/2004 | Pfeiffer et al. |

FOREIGN PATENT DOCUMENTS

| | | |
|---|---|---|
| GB | 2 268 734 A | 1/1994 |
| JP | 2001057381 | 2/2001 |

\* cited by examiner

*Primary Examiner*—Rinaldi I. Rada
*Assistant Examiner*—John Paradiso
(74) *Attorney, Agent, or Firm*—Bracewell & Giuliani LLP

(57) ABSTRACT

A system for removing covers from shipping cassettes that are used to ship computer disk media unlatches the covers and separates them from the cassette in a single fixture position. A movable fork unlatches a top cover from a bottom cover while the cassette is rotated off of the bottom cover. This action unlatches and separates the two covers allowing the removal of the bottom cover from the cassette in one motion. The top cover is then easily lifted off of the bottom cover.

15 Claims, 9 Drawing Sheets

SYSTEM, METHOD, AND APPARATUS FOR REMOVING COVERS FROM SHIPPING CONTAINERS

BACKGROUND OF THE INVENTION

1. Technical Field

The present invention relates in general to efficiently handling the packaging of products and, in particular, to an improved system, method, and apparatus for removing the covers from shipping containers of computer disk media.

2. Description of the Related Art

Referring to FIGS. 1 and 2, a typical shipping container or cassette 11 for holding a plurality of workpieces 12 (e.g., computer disk media) is shown. The cassette 11 has a main body 13 that engages and supports the workpieces 12 therein. The cassette 11 has open upper and lower ends that are covered by upper and lower lids or covers 15, 17, respectively. The upper and lower covers 15, 17 wrap around the body 13 to engage each other via interlocking tabs 19 and flexible clasps 21. One paired set of the tabs 19 and clasps 21 are located on each end of the cassette 11. When the three pieces of cassette 11 are mounted together (i.e., the body 13 and two covers 15, 17), the workpieces 12 located therein are protected from damage during shipping. The tabs 19 engage small slots in the clasps 21 to capture the body 13 therebetween. A small recess 23 is located between each clasp 21 and the end wall of the lower cover 17. In addition, the cassette 11 has pockets 25 located to the left and right of each of the clasps 21.

The three components that form cassette 11 are disassembled by bending the two clasps 21 outward or away from tabs 19, and then lifting upper cover 15 and (optionally) lowering lower cover 17 away from body 13. The workpieces 12 are then physically exposed while seated in the body 13 and ready for removal therefrom via the open upper end of the body 13.

Historically, the covers 15, 17 have been manually removed from the body 13. However, manual removal of the covers 15, 17 on a large volume basis is a probable source of repetitive motion injury to the operators. FIG. 14 depicts a prior art fixture 31 for removing the covers 15, 17 from body 13. This fixture 31 requires the cassette 11 to be mounted at a first position 33 to unlatch the tabs 19 from the clasps 21, and then moved to a second position 35 to remove the lower cover 17 from body 13. Unfortunately, this prior art design is a potential source of cover breakage (e.g., tabs 19 and clasps 21) and requires multiple hand motions to unlatch the covers before they are removed from the cassettes. Moreover, the end features on fixture 31 tend to force clasps 21 to reengage the tabs 19 and thereby prevent efficient disassembly of the components. Although this solution is workable, an improved solution would be desirable. For example, a reduction in the amount of hand motion would reduce operator fatigue. In addition, means for ensuring that the tab 19 is bent outward away from clasp 21 before the lower cover 17 is removed would prevent breakage of the tab 19.

SUMMARY OF THE INVENTION

One embodiment of a system, method, and apparatus for easily and quickly removing covers from shipping cassettes that are used to ship computer disk media is disclosed. This solution unlatches the covers and separates them from the cassette in a single fixture position with fewer motions and with less breakage. The present invention uses a movable fork to unlatch one end of the top cover from the bottom cover while the cassette is rotated off of the other end of the bottom cover. This action unlatches and separates the two covers to remove the bottom cover from the cassette in one motion. The top cover is then easily lifted off of the bottom cover. The advantage of this tool is that the unlatching and cover removal can be done in one motion on a single fixture position instead of having to move the cassette between two separate positions on a fixture. It also reduces the number of broken covers by ensuring that the covers are unlatched prior to separating and removing them.

To use the tool, the cassette is placed between the side walls, either on top of a pair of guide rails (e.g., for a 95 mm, 84 mm, or 70 mm cassette), or in a slot between the guide rails (e.g., 65 mm cassette). The cassette is moved forward until it contacts the front of the catch and is then rocked down on top of the fork. As the covers move down on the fork, the slope of the fork pulls the top cover forward and unlatches it from the bottom cover. The fork is mounted to a spring-loaded slide, so that the now-unlatched cover and the cassette are slid forward. This slides the bottom cover under the catch. The cassette is then rocked backward over the inner guide rails and the bottom cover is pried off of the cassette. The cassette is pulled off the tool toward the rear and operator catches the loose bottom cover and removes it from the latch on the other end of the cassette. The top cover is then easily lifted off and the contents of the cassette made accessible.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
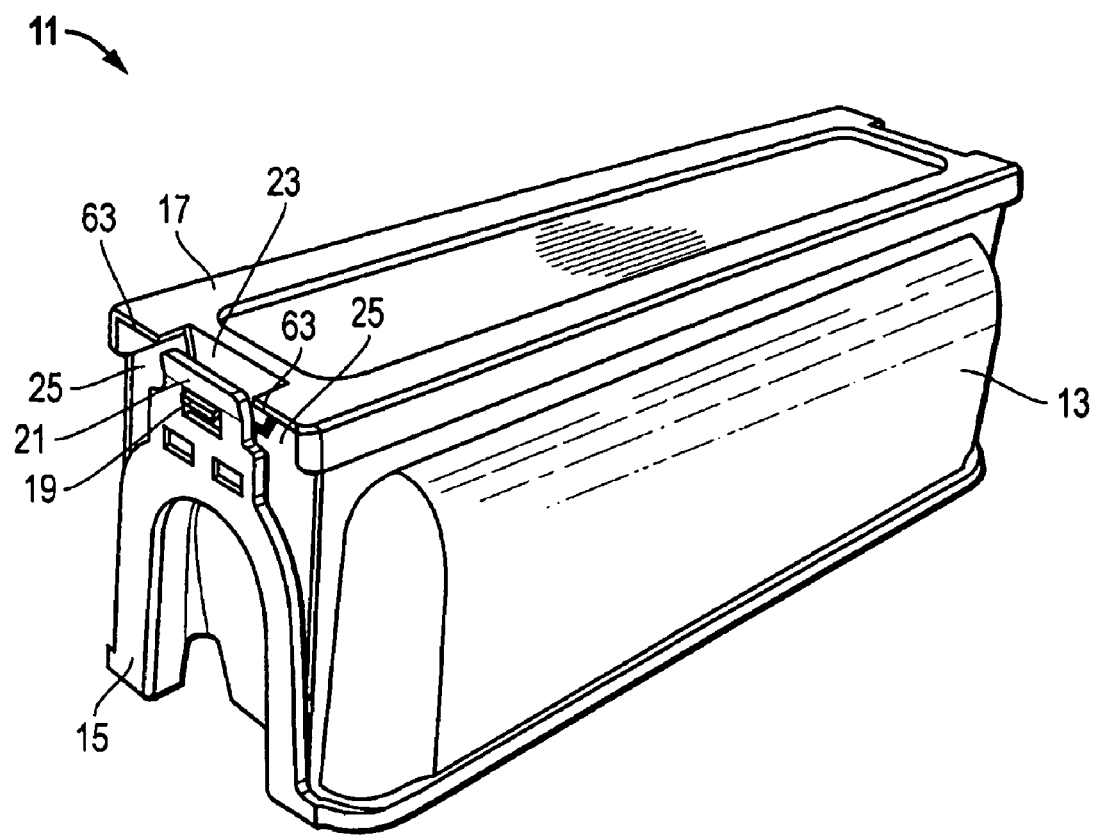
FIG. 1 is a bottom isometric view of a conventional shipping container or cassette.

Referring to FIGS. 3-13, one embodiment of a system, apparatus, and method for removing a cover from a shipping container is disclosed. The apparatus comprises a fixture 41 (FIGS. 3 and 4) having a base 43 with a longitudinal axis 45, a lateral axis 47 orthogonal to the longitudinal axis 45, and a transverse (i.e., vertical) axis 49 orthogonal to both the longitudinal and lateral axes 45, 47. A surface 50 extends in a plane defined by the longitudinal and lateral axes 45, 47. Side walls 51 extend transversely (i.e., vertically) from the surface 50, and a slot 53 is defined longitudinally between the side walls 51 and extends along the surface 50 for supporting the cassette or shipping container 11.

Figure 2:
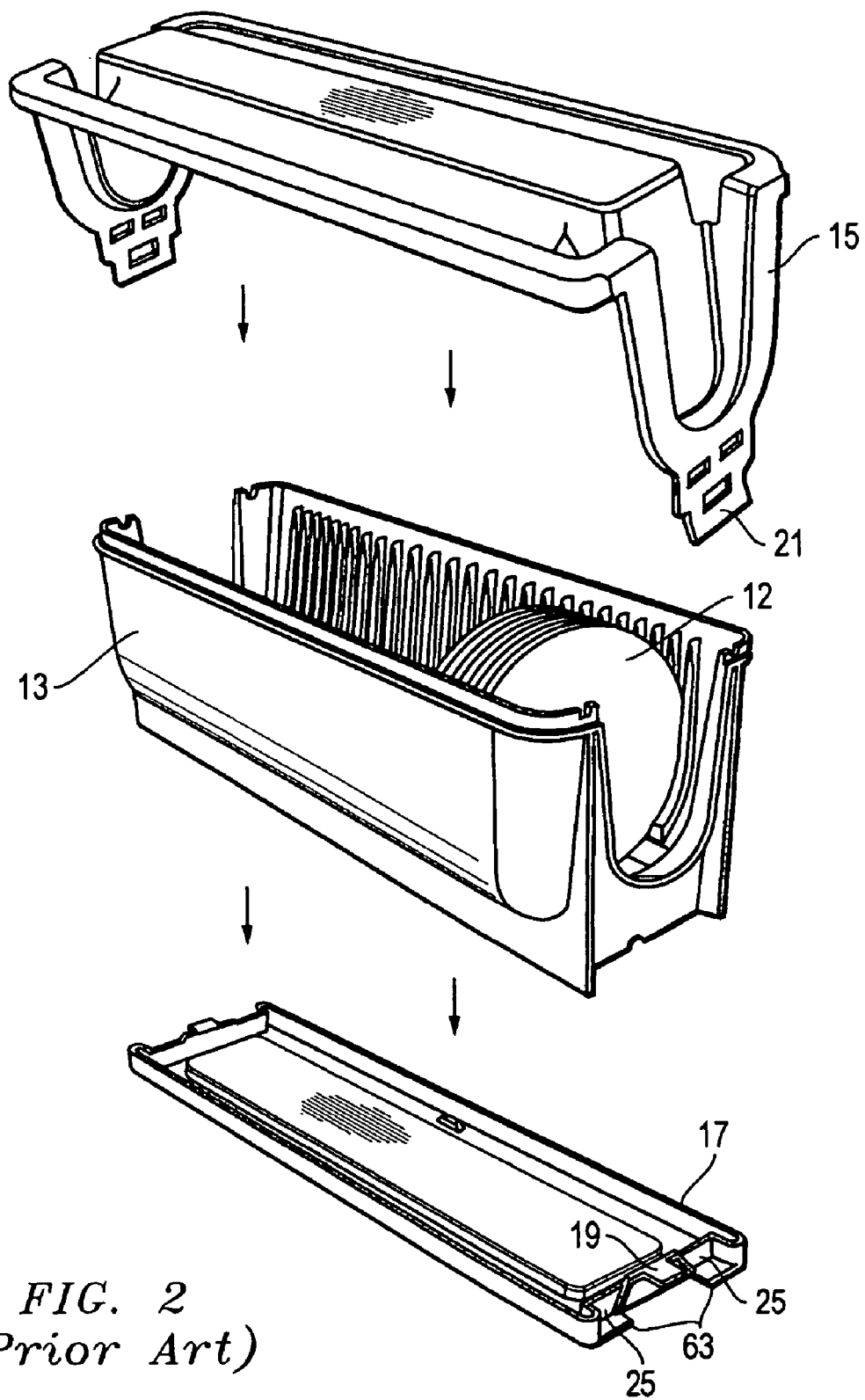
FIG. 2 is an exploded top isometric view of the conventional cassette of FIG. 1.
Figure 3:
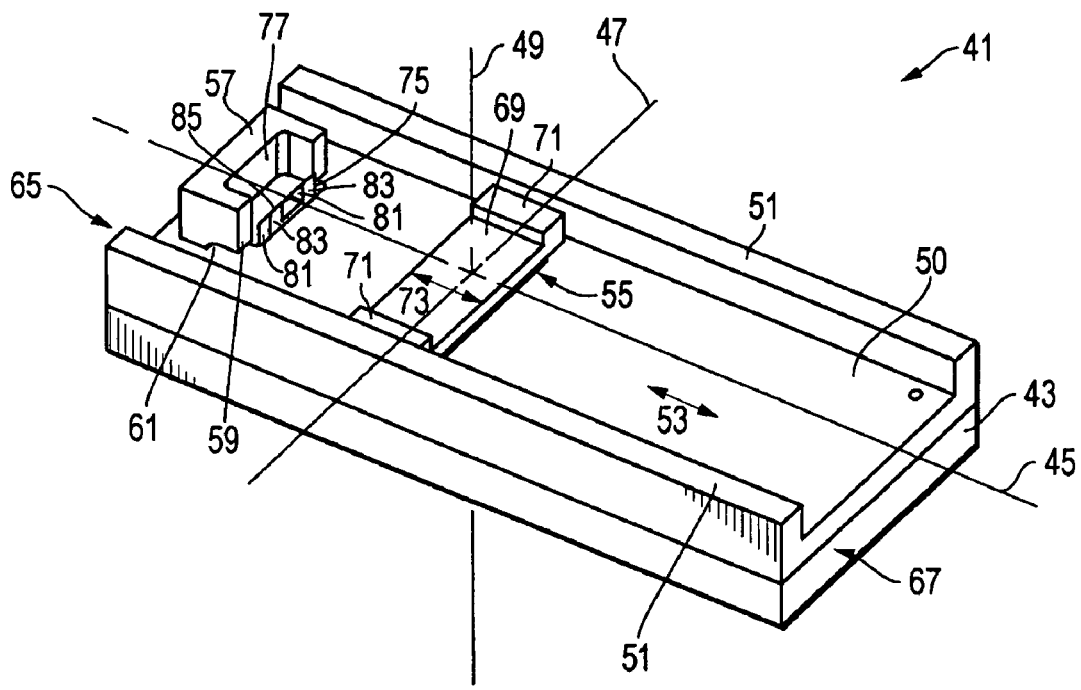
FIG. 3 is a top isometric view of one embodiment of a fixture for disassembling the cassette of FIGS. 1 and 2 and is constructed in accordance with the present invention.
Figure 4:
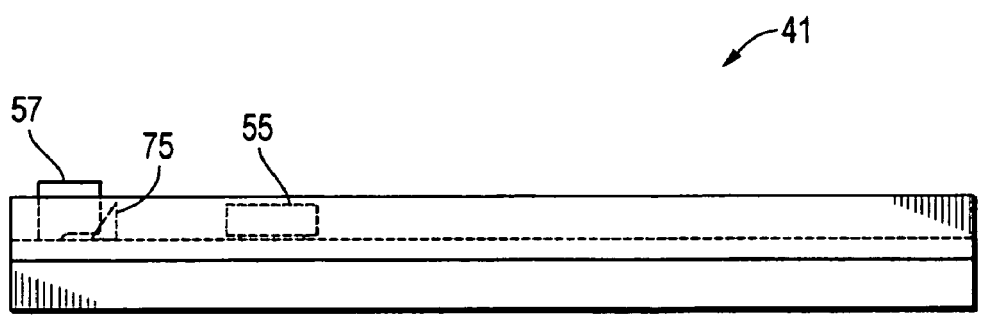
FIG. 4 is a side view of the fixture of FIG. 3 and is constructed in accordance with the present invention.
Figure 5:
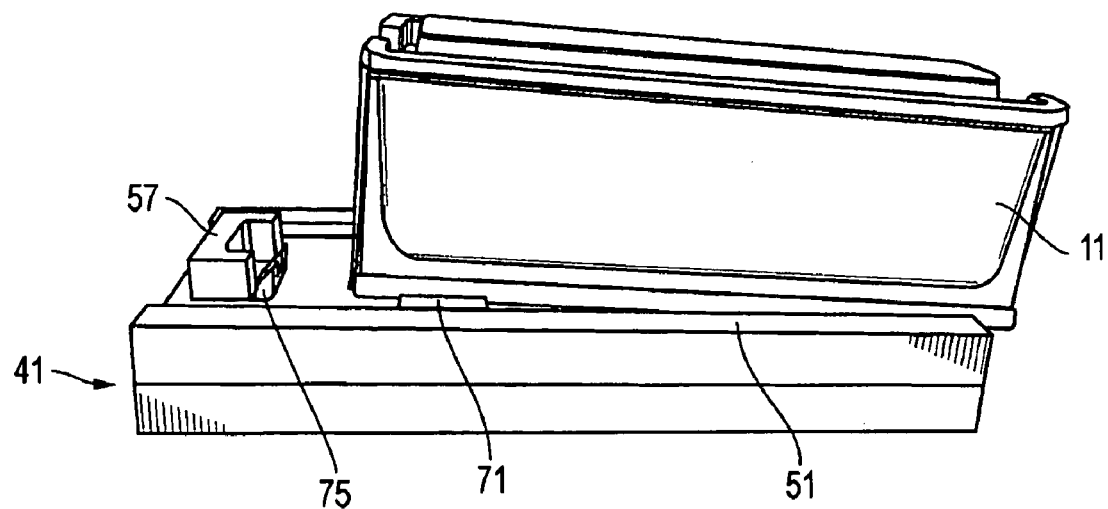
FIG. 5 is a side view of the fixture of FIG. 3 during an initial step of operation and is constructed in accordance with the present invention.
Figure 6:
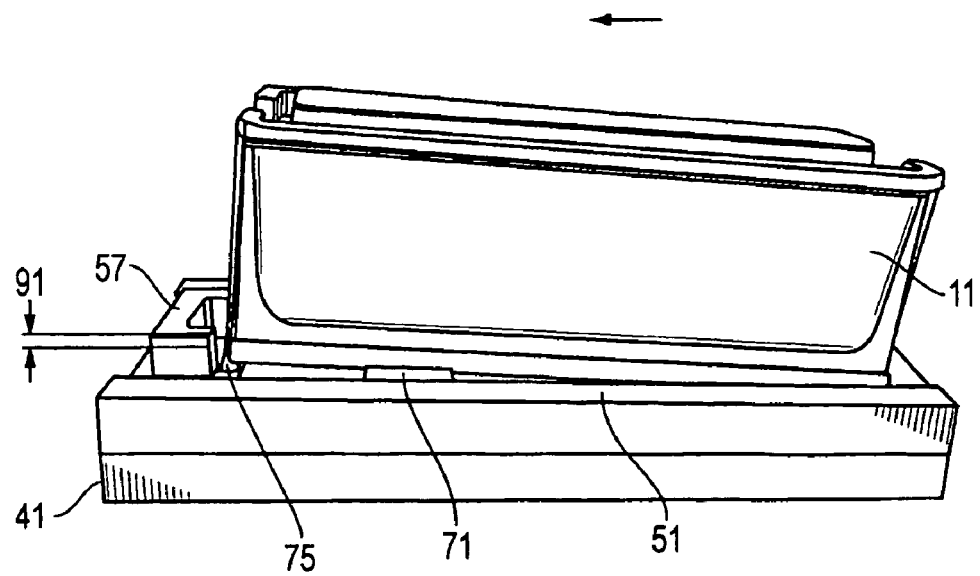
FIG. 6 is a side view of the fixture of FIG. 3 during a step of operation subsequent to FIG. 5 and is constructed in accordance with the present invention.
Figure 7:
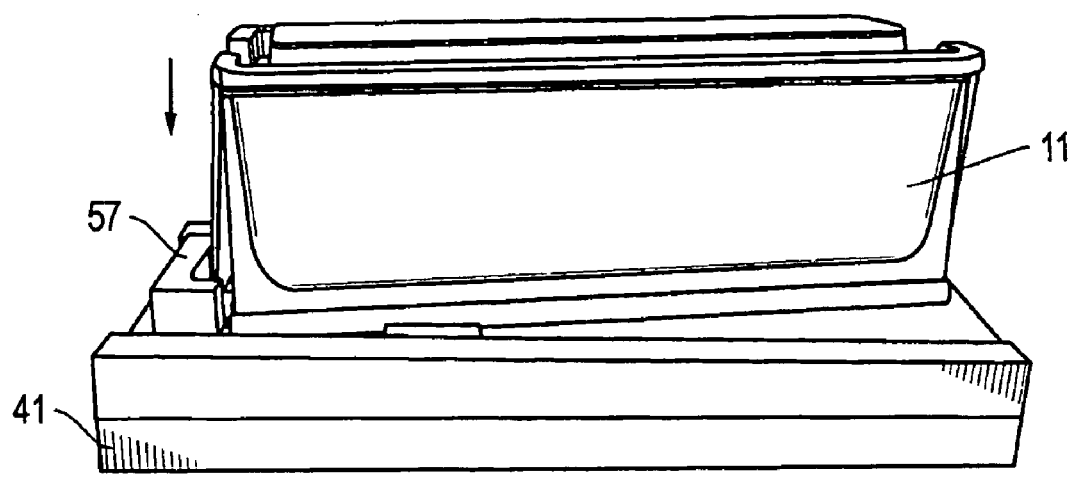
FIG. 7 is a side view of the fixture of FIG. 3 during a step of operation subsequent to FIG. 6 and is constructed in accordance with the present invention.
Figure 8:
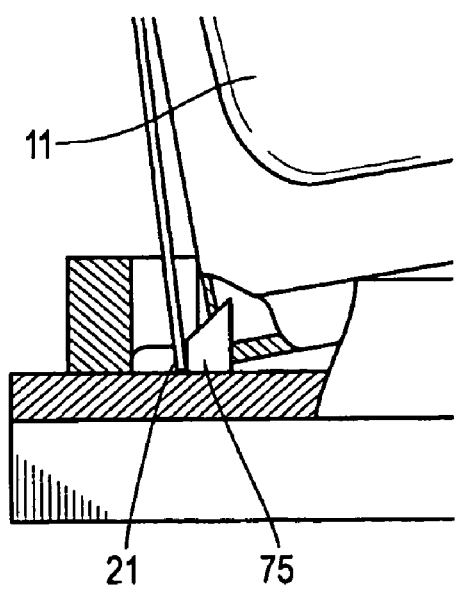
FIG. 8 is an enlarged sectional side view of the fixture of FIG. 3 during a step of operation subsequent to FIG. 7 and is constructed in accordance with the present invention.
Figure 9:
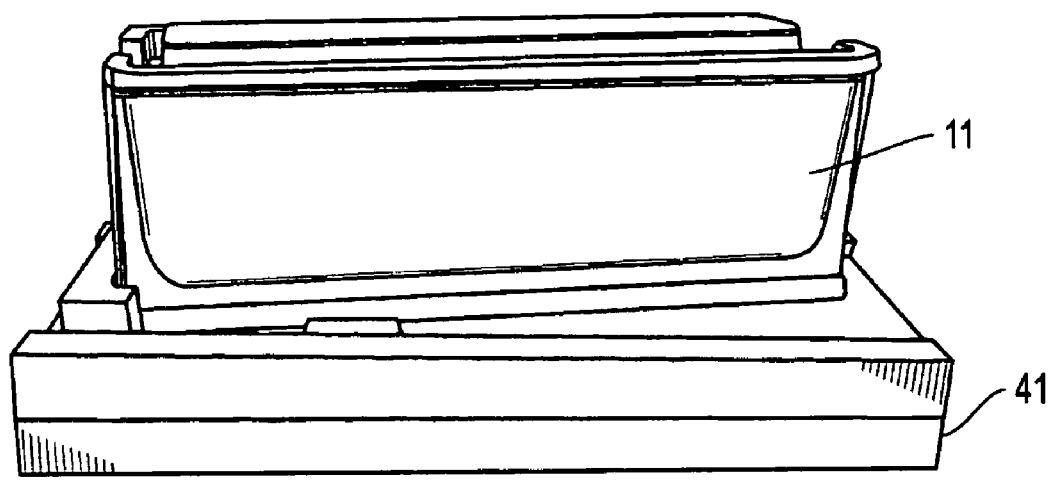
FIG. 9 is a side view of the fixture of FIG. 3 during a step of operation subsequent to FIG. 8 and is constructed in accordance with the present invention.
Figure 10:
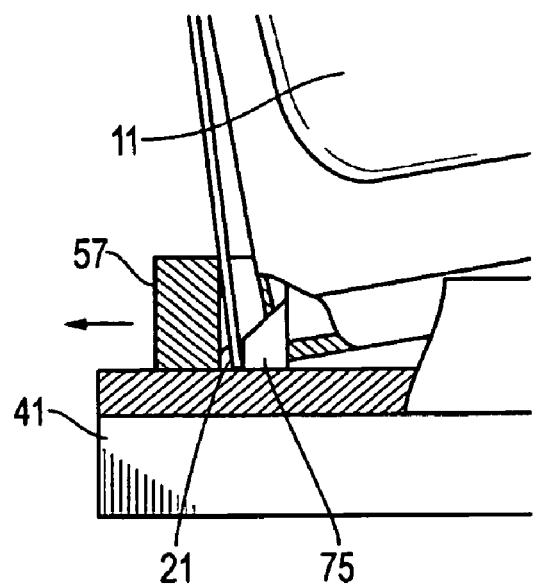
FIG. 10 is an enlarged sectional side view of the fixture of FIG. 3 during a step of operation subsequent to FIG. 9, and is constructed in accordance with the present invention.
Figure 11:
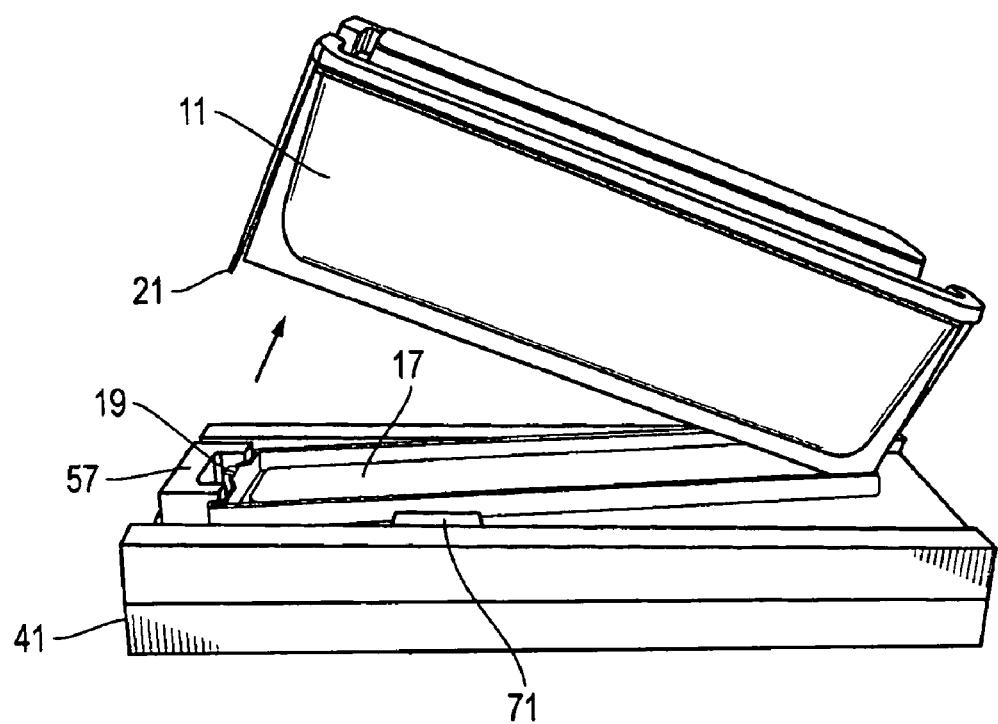
FIG. 11 is a side view of the fixture of FIG. 3 during a step of operation subsequent to FIG. 10, and is constructed in accordance with the present invention.
Figure 12:
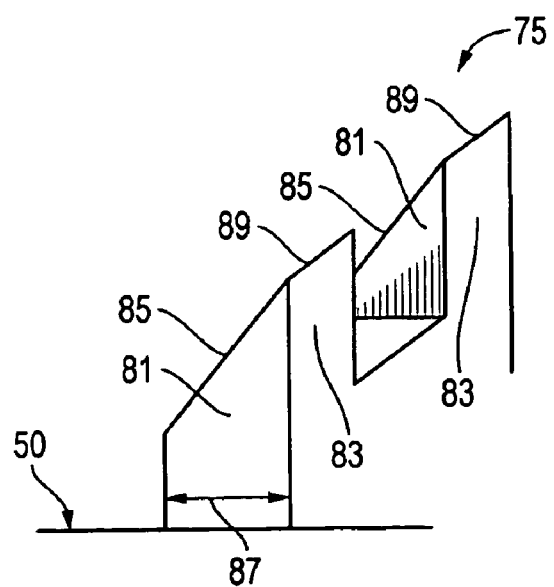
FIG. 12 is an enlarged isometric view of a fork on the fixture of FIG. 3 and is constructed in accordance with the present invention.

In one embodiment, a pivot guide 55 is mounted to the surface 50 and extends laterally between the side walls 51. The pivot guide 55 guides the shipping container 11 and acts as a fulcrum for pivoting of the shipping container 11 during cover removal. A catch 57 is mounted to the surface 50 and is longitudinally spaced apart from the pivot guide 55. The catch 57 has a lip 59 extending longitudinally that is transversely spaced apart from the surface 50 to define a slit 61 for receiving a portion 63 (FIGS. 1 and 2) of the cover (e.g., the bottom cover 17). The lip 59 engages the bottom cover 17 during its removal from the shipping container 11 in a longitudinally deeper position (FIGS. 9-11).

In the illustrated embodiment, the catch 57 is mounted adjacent a longitudinal end 65 of the base 43 and is laterally centered between the side walls 51. The pivot guide 55 is mounted longitudinally closer to the catch 57 than to an opposite longitudinal end 67 of the base 43. The pivot guide 55 has a pivot guide surface 69 transversely spaced apart from and parallel to the surface 50. Rails 71 extend transversely from the pivot guide surface 69 parallel to and abutting the side walls 51. In one embodiment, the side walls 51 are taller in the transverse direction than the rails 71. A pivot guide slot 73 is defined longitudinally between the rails 71 and extends along the pivot guide surface 69.

The fixture 41 is designed to remove covers from shipping containers 11 of different sizes. The pivot guide 55 guides shipping containers of a larger size on top of the rails 71 but between side walls 51, rather than between the rails 71 (as shown for a small container 11). This design improves the guiding and handling of larger containers 11 when they rest on top of rails 71.

In one embodiment, a fork 75 (FIGS. 3 and 12) is mounted to the base 43 adjacent the catch 57 and extends transversely above the surface 50 as shown. The fork 75 is longitudinally movable relative to the base 43, the pivot guide 55, and the catch 57 (compare FIGS. 8 and 10). The fork 75 engages the covers 15, 17 and moves longitudinally during disassembly of shipping container 11. In the embodiment shown, the lips 59 on the catch 57 have a central longitudinal recess 77 for accommodating the fork 75 and the clasp 21 on cover 15.

In the embodiment shown, the fork 75 comprises a pair of tines 81 (FIG. 12) extending transversely from the surface 50. Each of the tines 81 has an orthogonal surface 83 facing the pivot guide 55 and an inclined surface 85 opposite the orthogonal surface 83 that tapers from a maximum longitudinal dimension 87 adjacent the surface 50 to a lateral edge 89 that is transversely spaced apart from the surface 50.

In operation (FIGS. 5-11), the shipping container 11 is placed in the slot 53 and pivot guide 55, pushed longitudinally into contact with the catch 57, pivoted transversely about the pivot guide 55 toward the fork 75 such that the fork 75 deflects a portion of the cover from the shipping container (i.e., the fork 75 separates one of the clasps 21 from an associated one of the tabs 19), pushed longitudinally deeper into the slit 61 of the catch 57 to longitudinally move the fork 75, and then pulled transversely away from the fork 75 such that the lip 59 pulls the lower cover 17 from body 13 and top cover 15.

When the shipping container 11 is pushed longitudinally into contact with the catch 57, there is a transverse clearance 91 (FIG. 6) between the top edges 89 of the fork 75 and a bottom of the clasp 21. Prior to longitudinal movement of the fork 75 (FIG. 6-8), the fork 75 is longitudinally closer to the pivot guide 55 than the lip 59 on the catch 57. After longitudinal movement of the fork 75 (FIGS. 9-11), the fork 75 is longitudinally flush with the lip 59 on the catch 57.

Figure 13:
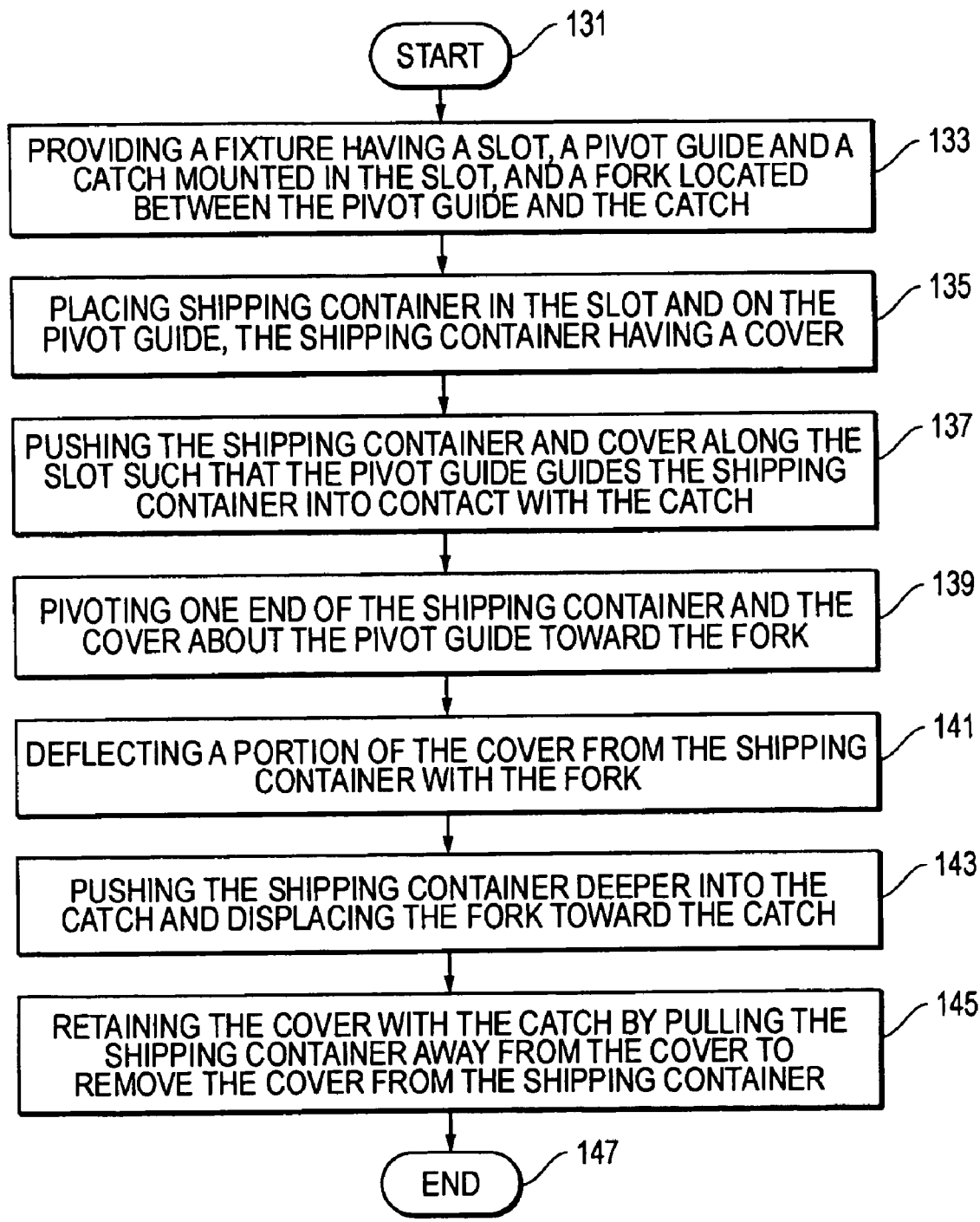
FIG. 13 is a high level flow diagram of one embodiment of a method constructed in accordance with the present invention.
Figure 14:
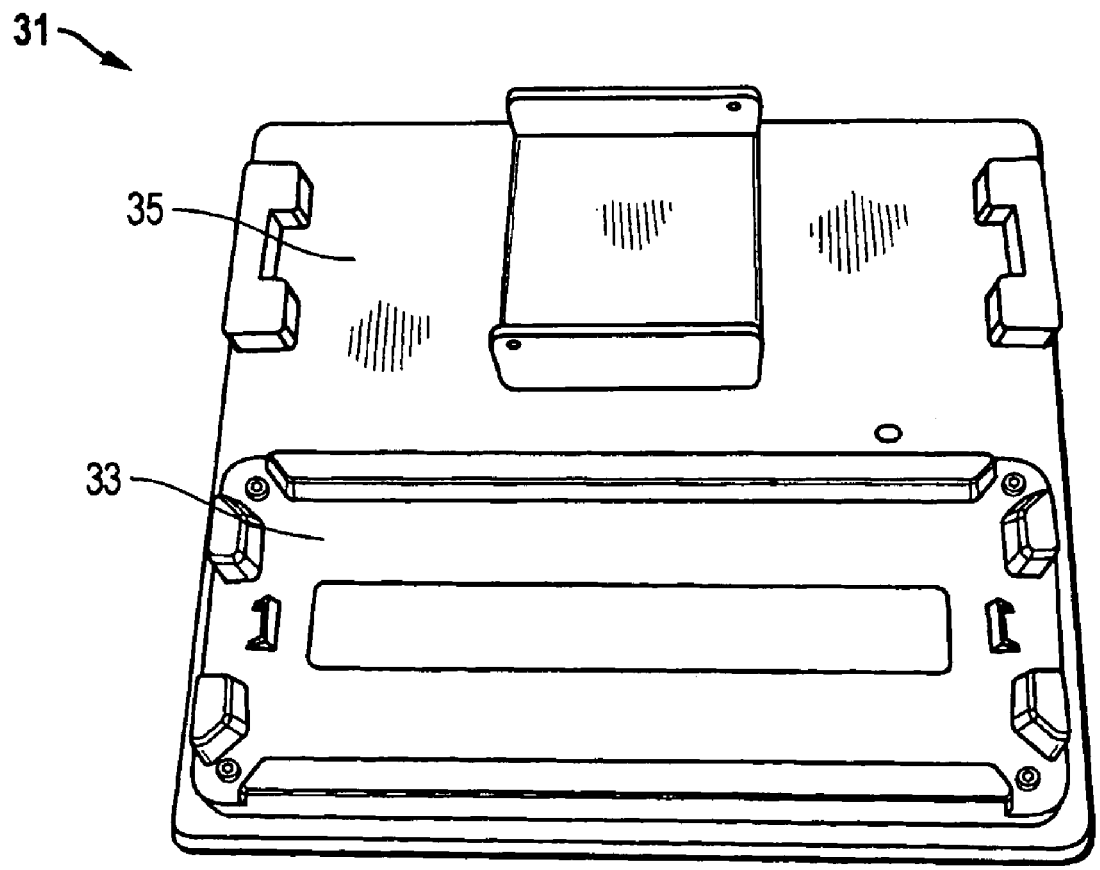
FIG. 14 is a top isometric view of a prior art fixture for disassembling the cassette of FIGS. 1 and 2.

Referring now to FIG. 13, the present invention also comprises a method of removing covers from shipping containers of various sizes. One embodiment of the method starts as indicated at step 131, and comprises providing a fixture (step 133) having a slot, a pivot guide and a catch mounted in the slot, and a fork located between the pivot guide and the catch; placing a shipping container in the slot and on the pivot guide (step 135), the shipping container having a cover; pushing the shipping container and cover along the slot such that the pivot guide guides the shipping container into contact with the catch (step 137); pivoting one end of the shipping container and the cover about the pivot guide toward the fork (step 139); deflecting a portion of the cover from the shipping container with the fork (step 141); pushing the shipping container deeper into the catch and displacing the fork toward the catch (step 143); and then retaining the cover with the catch by pulling the shipping container away from the cover to remove the cover from the shipping container (step 145), before ending as indicated at step 147.

An alternate embodiment of the method of the present invention comprises mounting the catch adjacent an end of the fixture and mounting the pivot guide closer to the catch than to an opposite end of the fixture. When the shipping container is of a relatively small size, another alternate embodiment of the method comprises placing the shipping container in a slot formed in the pivot guide between rails. When the shipping container is of a relatively large size, the shipping container is placed on top of the rails. Yet another alternate embodiment of the method comprises forming lips on the catch and a recess therebetween for accommodating the fork and the portion of the cover.

The present invention has several advantages, including the ability to unlatch and remove cassette covers in one motion on a single fixture instead of having to move the cassette between two fixtures mounted on one plate. It also reduces the number of broken covers by ensuring that the covers are unlatched prior to separating and removing them.

While the invention has been shown or described in only some of its forms, it should be apparent to those skilled in the art that it is not so limited, but is susceptible to various changes without departing from the scope of the invention.

What is claimed is:

1. A fixture for removing a cover from a shipping container, the fixture comprising:
    a base having a longitudinal axis, a lateral axis orthogonal to the longitudinal axis, a transverse axis orthogonal to both the longitudinal and lateral axes, a surface extending in a plane defined by the longitudinal and lateral axes, side walls extending transversely from the surface, a slot defined longitudinally between the side walls and extending along the surface, and the slot being adapted to support the shipping container;
    a pivot guide mounted to the surface and extending laterally between the side walls, the pivot guide being adapted to guide the shipping container and act as a fulcrum for the shipping container during cover removal;
    a catch mounted to the surface and longitudinally spaced apart from the pivot guide, the catch having a lip extending longitudinally that is transversely spaced apart from the surface to define a slit for receiving a portion of the cover, and the lip being adapted to engage the cover during removal from the shipping container; and
    a fork mounted to the base adjacent the catch and extending transversely above the surface, the fork being longitudinally movable relative to the base, the pivot guide, and the catch, and the fork being adapted to engage the cover and moved longitudinally during removal from the shipping container.

2. A fixture according to claim 1, wherein the catch is mounted adjacent a longitudinal end of the base and centered between the side walls, and the pivot guide is mounted closer to the catch than to an opposite longitudinal end of the base.

3. A fixture according to claim 1, wherein the pivot guide has a pivot guide surface transversely spaced apart from and parallel to said surface, rails extending transversely from the pivot guide surface parallel to and abutting the side walls, and a pivot guide slot defined longitudinally between the rails and extending along the pivot guide surface; wherein the fixture is adapted to remove covers from shipping containers of at least two different sizes; and wherein
    the pivot guide slot is adapted to guide shipping containers of a smaller size, and shipping containers of a larger size are adapted to be guided on top of the rails.

4. A fixture according to claim 1, wherein the lip on the catch comprises lips having a central longitudinal recess therebetween for accommodating the fork and a portion of the cover.

5. A fixture according to claim 1, wherein the fork comprises tines extending transversely from the surface, each of the tines having an orthogonal surface facing the pivot guide and an inclined surface opposite the orthogonal surface that tapers from a maximum longitudinal dimension adjacent the surface to a lateral edge that is transversely spaced apart from the surface.

6. A system for removing covers from shipping containers of various sizes, the system comprising:
    a fixture having a base including a longitudinal axis, a lateral axis orthogonal to the longitudinal axis, a transverse axis orthogonal to both the longitudinal and lateral axes, a surface extending in a plane defined by the longitudinal and lateral axes, a pair of side walls extending transversely from the surface, a slot defined longitudinally between the pair of side walls and extending along the surface;
    a pivot guide mounted to the surface and extending laterally between the pair of side walls;
    a catch mounted to the surface and longitudinally spaced apart from the pivot guide, the catch having a lip extending longitudinally toward the pivot guide that is transversely spaced apart from the surface to define a slit for receiving a portion of the cover;
    a fork mounted to the base adjacent the catch and extending transversely above the surface, the fork being longitudinally movable relative to the base, the pivot guide, and the catch; and
    the shipping container is placed in the slot and pivot guide, pushed longitudinally into contact with the catch, pivoted transversely about the pivot guide toward the fork such that the fork deflects a portion of the cover from the shipping container, pushed longitudinally deeper into the slit of the catch and longitudinally move the fork, and then pulled transversely away from the fork such that the lip pulls the cover from the shipping container.

7. A system according to claim 6, wherein the catch is mounted adjacent a longitudinal end of the base and centered between the side walls, and the pivot guide is mounted closer to the catch than to an opposite longitudinal end of the base.

8. A system according to claim 6, wherein the pivot guide has a pivot guide surface transversely spaced apart from and parallel to said surface, a pair of rails extending transversely from the pivot guide surface parallel to and abutting the side walls, and a pivot guide slot defined longitudinally between the pair of rails and extending along the pivot guide surface; and wherein
    the pivot guide slot guides shipping containers of a smaller size, and shipping containers of a larger size are guided on top of the pair of rails.

9. A system according to claim 6, wherein the lip on the catch comprises two lips having a central longitudinal recess therebetween for accommodating the fork and a portion of the cover.

10. A system according to claim 9, wherein portions of one of the shipping containers fits in the lip slots in the longitudinally deeper position.

11. A system according to claim 6, wherein the fork comprises tines extending transversely from the surface, each of the tines having an orthogonal surface facing the pivot guide and an inclined surface opposite the orthogonal surface that tapers from a maximum longitudinal dimension adjacent the surface to a lateral edge that is transversely spaced apart from the surface.

12. A system according to claim 6, wherein the shipping container comprises a cassette having an upper cover and a tower cover, the upper cover having a clasp on each end that engages tabs on ends of the lower cover to capture the cassette therebetween, and wherein the fork separates one of the clasps from an associated one of the tabs.

13. A system according to claim 12, wherein when the shipping container is pushed longitudinally into contact with the catch, there is a transverse clearance between a top of the fork and a bottom of said one of the clasps.

14. A system according to claim 12, wherein prior to longitudinal movement of the fork, the fork is longitudinally closer to the pivot guide than the lip on the catch, and after longitudinal movement of the fork, the fork is longitudinally flush with the lip on the catch.

15. A system according to claim 12, wherein a portion of the bottom cover fits in the slit between the lip and the surface in the longitudinally deeper position.

* * * * *